(12) United States Patent
Vance (10) Patent No.: US 8,719,874 B2
(45) Date of Patent: May 6, 2014

(54) SYSTEM AND METHOD OF STREAMING AUDIO FROM A COMMON VIDEO DEVICE

(75) Inventor: Scott L. Vance, Cary, NC (US)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 2477 days.

(21) Appl. No.: 10/951,826

(22) Filed: Sep. 28, 2004

(65) Prior Publication Data

US 2006/0075439 A1 Apr. 6, 2006

(51) Int. Cl.
*H04N 7/16* (2011.01)

(52) U.S. Cl.
USPC .......................................... 725/62

(58) Field of Classification Search
USPC .................. 725/62, 133, 143–153, 74–85
See application file for complete search history.

(56) References Cited

U.S. PATENT DOCUMENTS

| | | | |
|---|---|---|---|
| 5,510,828 A * | 4/1996 | Lutterbach et al. | 725/138 |
| 6,408,278 B1 * | 6/2002 | Carney et al. | 705/14.73 |
| 6,549,768 B1 * | 4/2003 | Fraccaroli | 455/456.3 |
| 6,698,020 B1 * | 2/2004 | Zigmond et al. | 725/34 |
| 6,977,909 B2 * | 12/2005 | Minborg | 370/260 |
| 7,136,999 B1 * | 11/2006 | Griffiths | 713/168 |
| 2001/0054180 A1 * | 12/2001 | Atkinson | 725/32 |
| 2001/0055951 A1 | 12/2001 | Slotznick | |
| 2002/0094787 A1 * | 7/2002 | Avnet et al. | 455/68 |
| 2002/0098878 A1 | 7/2002 | Mooney et al. | |
| 2003/0050058 A1 | 3/2003 | Walsh et al. | |
| 2004/0063459 A1 | 4/2004 | Yamashita et al. | |
| 2004/0125136 A1 * | 7/2004 | Wallenius | 345/764 |

FOREIGN PATENT DOCUMENTS

| | | | |
|---|---|---|---|
| EP | 1 367 829 | 12/2003 | |
| EP | 1367829 A2 * | 12/2003 | H04N 7/24 |
| JP | 2001292238 | 10/2001 | |
| JP | 2002109102 | 4/2002 | |
| JP | 2003032754 | 1/2003 | |
| JP | 2004032160 | 1/2004 | |
| WO | WO 2004/056052 | 7/2004 | |

OTHER PUBLICATIONS

PCT/US2005/012567 International Search Report mailed Aug. 5, 2005.
J.T. Vainio: "Bluetooth security" Department of Computer Science and Engineering, Helsinki University of Technology, 'Online! May 25, 2000, XP002337348.
Rathi, Sailesh, "Blue Tooth Protocol Architecture," Dedicated Systems Magazine, 2000 Q4, pp. 28-33.

(Continued)

*Primary Examiner* — Brian T Pendleton
*Assistant Examiner* — Dika C. Okeke
(74) *Attorney, Agent, or Firm* — Coats & Bennett, P.L.L.C.

(57) ABSTRACT

The present invention discloses a system and method for rendering an audio signal over a wireless communication device where the video signal associated with the audio signal is being output to one or more displays in an audio-video system. The audio-video system includes a controller that outputs the video signal to the one or more displays, and a transceiver that transmits an audio signal associated with the video signal to the wireless communication device. A transceiver in the wireless communication device receives the transmitted audio signal from the audio-video system, and an audio processing circuit renders the audio signal as audible sound to the user of the wireless communication device.

42 Claims, 7 Drawing Sheets

(56) References Cited

OTHER PUBLICATIONS

Form PCT/Separate Sheet/409 (Sheet 1), International Application No. PCT/US2005/012567, Mailed: Dec. 27, 2006.

"Bluetooth Technology Frequently Asked Questions," MobileInfo.com, pp. 1-4, www.mobileinfo.com/bluetooth/faq.htm, Nov. 17, 2006.

* cited by examiner

SYSTEM AND METHOD OF STREAMING AUDIO FROM A COMMON VIDEO DEVICE

BACKGROUND

The present invention relates generally to wireless communication devices, and particularly to wireless communication devices that render audio associated with remotely displayed video signals.

In many situations, the public may view video that is output to a common display. For example, airlines typically show in-flight movies to their passengers. Airports usually have some kind of news or other program playing on televisions throughout their terminals. Likewise, some large cities, such as Tokyo, Japan, display commercial advertisements, news, and weather on oversized display screens in areas where the public is likely to congregate. In each of these examples, the public benefits from being able to view the video output as well as listen to the associated audio over one or more speakers.

However, audible noise is inherently present in public areas. As a result, viewers often have difficulty in actually hearing the audio over the loudspeakers. Further, users viewing the video output typically have little or no control over the availability of the associated audio. Therefore, it would be advantageous for users to be able to view video on a display while permitting them the ability to control the audio using a remote device. Because wireless communication devices permeate the marketplace, they would be ideal devices over which users may listen to and control the audio associated with a particular video.

SUMMARY

The present invention comprises an audio-video system and a wireless communication device. The system outputs a video signal to a common, publicly accessible display, and an associated audio signal to a user's wireless communication device. The user has the ability to request and control the audio stream output from the system.

In one embodiment, the audio-video system and the wireless communication device include corresponding short-range transceivers. The audio-video system may output a video signal to a display. As the user's device comes within close proximity to the display, a communications link (e.g., a short-range interface) is established between the two short-range transceivers. The audio-video system and the user's device negotiate user preferences, which may include a selected language pre-configured by the user. Alternatively, the user may enter the preferences from the keypad of the wireless communication device. Once the link is established, the system transmits the audio signal associated with the video being displayed to the wireless communication device. Upon receipt of the audio signal, an audio processing circuit in the user's device renders the audio signal as audible sound through a speaker of the device or a headset attached to the device.

In another embodiment, the audio-video system and the wireless communication device include corresponding long-range transceivers to communicate with one or more base station subsystems disposed in a wireless communication network. Typically, the wireless communication network tracks the position of the user's device, and brokers a communication link between the audio-video system and the user's device. The establishment of the communication link may be based on the user's geographic location with respect to the audio-video system or, alternatively, responsive to a request received from either the wireless communication device or the audio-video system. As in the previous embodiment, user preference information regarding a selected language, for example, may be relayed to the system from the device via the wireless communication network. The audio-video system transmits the audio signal, which is then relayed to the user's device by the wireless communication network. The user's device then renders the received audio signal as audible sound to the user.

DETAILED DESCRIPTION

Figure 1:
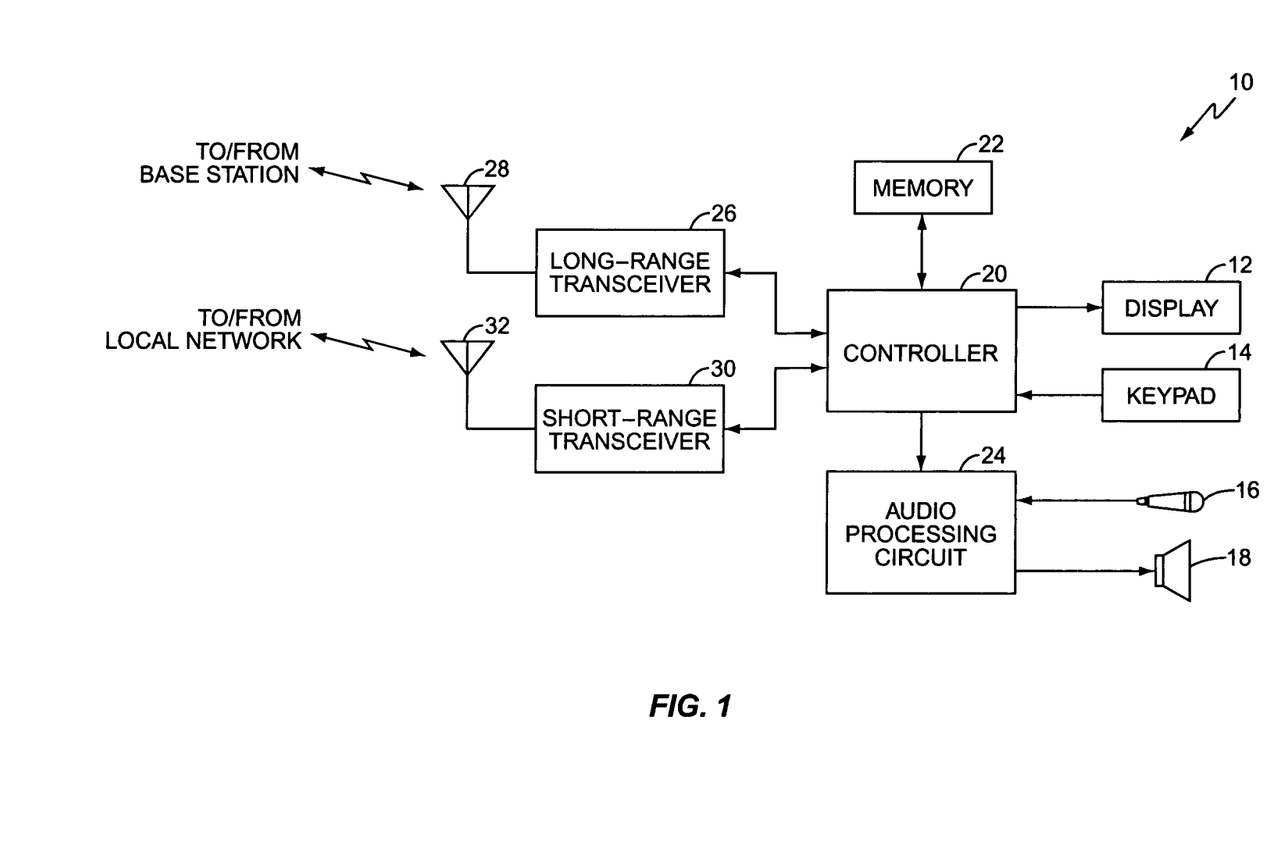
FIG. 1 illustrates a wireless communication device configured to operate according to one embodiment of the present invention.

Turning now to the drawings, FIG. 1 illustrates a wireless communication device 10 according to one embodiment of the present invention. In the exemplary embodiment, wireless communication device 10 comprises a cellular telephone. However, those skilled in the art will readily appreciate that the present invention is applicable to any consumer electronics device having communications capability including, but not limited to, Personal Digital Assistants (PDAs), satellite telephones, Personal Communication Services (PCS) devices, palm computers, and the like.

Wireless communication device 10 includes a display 12, keypad 14, microphone 16, speaker 18, a controller 20, memory 22, and an audio processing circuit 24. Display 12 is connected to wireless communication device 10, and permits users to view dialed digits, call status, menu options, and other service information. Keypad 14 is disposed on a face of wireless communication device 10, and includes an alphanumeric keypad and other input controls such as a joystick, button controls, or dials (not shown). Keypad 14 allows the user to dial numbers, enter commands, and select options from menu systems. Additionally, keypad 14 permits the user to enter information responsive to queries originating from remote networks. Microphone 16 converts the user's speech into electrical audio signals, and speaker 18 converts received audio signals into audible sounds that can be heard by the user. Microphone 16 and speaker 18 are communicatively coupled to controller 20 via audio processing circuit 24, and may be comprised of any type of audio transducer known in the art. It should be noted that speaker 18 may be contained within the housing of wireless communication device 10, as part of a headset 34 (FIG. 4) typically coupled to wireless communication device 10, or both. As will be described later in more detail, speaker 18 and/or headset 34 permit the user to listen to audio associated with a particular video signal being displayed on a remote display.

Controller 20 controls the operation of wireless communication device 10 according to programs stored in memory 22, and may be implemented in a single microprocessor, or in multiple microprocessors. Suitable controllers 20 may include, for example, both general purpose and special purpose microprocessors and digital signal processors. Controller 20 may interface with audio processing circuit 24, which provides basic analog output signals to speaker 18 and receives analog audio inputs from microphone 16. Memory 22 may include both random access memory (RAM) and read-only memory (ROM). Computer program instructions and data required for operation are stored in non-volatile memory, such as EPROM, EEPROM, and/or flash memory, and may be implemented as discrete devices, stacked devices, or integrated with controller 20.

Wireless communication device 10 also includes a long-range transceiver 26 and a short-range transceiver 30. Long-range transceiver 26 is coupled to antenna 28 for receiving signals from and transmitting signals to one or more base stations subsystems in a wireless communication network. Long-range transceiver 26 is a fully functional cellular radio transceiver, and operates according to any known standard, including Global System for Mobile Communications (GSM), TIA/EIA-136, cdmaOne, cdma2000, UMTS, and Wideband CDMA.

Short-range transceiver 30 is coupled to antenna 32 for transmitting signals to and receiving signals from a corresponding short-range transceiver via a short-range interface. In one embodiment, short-range transceiver 30 is a BLUETOOTH transceiver or RF transceiver operating according to the IEEE 802.11 family of standards. As is well known in the art, BLUETOOTH is a universal radio interface that permits the creation of ad hoc networks, and is particularly well-suited for communications over short distances. For further details regarding BLUETOOTH technology, the interested reader may refer to "Bluetooth—The Universal Radio Interface for ad hoc, wireless connectivity," presented by Jaap Haartsen in Ericsson Review No. 3, 1998, which is incorporated herein by reference. While short-range transceiver 30 is shown as operating according to the BLUETOOTH standard, those skilled in the art will understand that short-range transceiver 30 may utilize any technology known in the art operable to transmit and receive signals over short distances including, but not limited to, infra-red.

Figure 2:
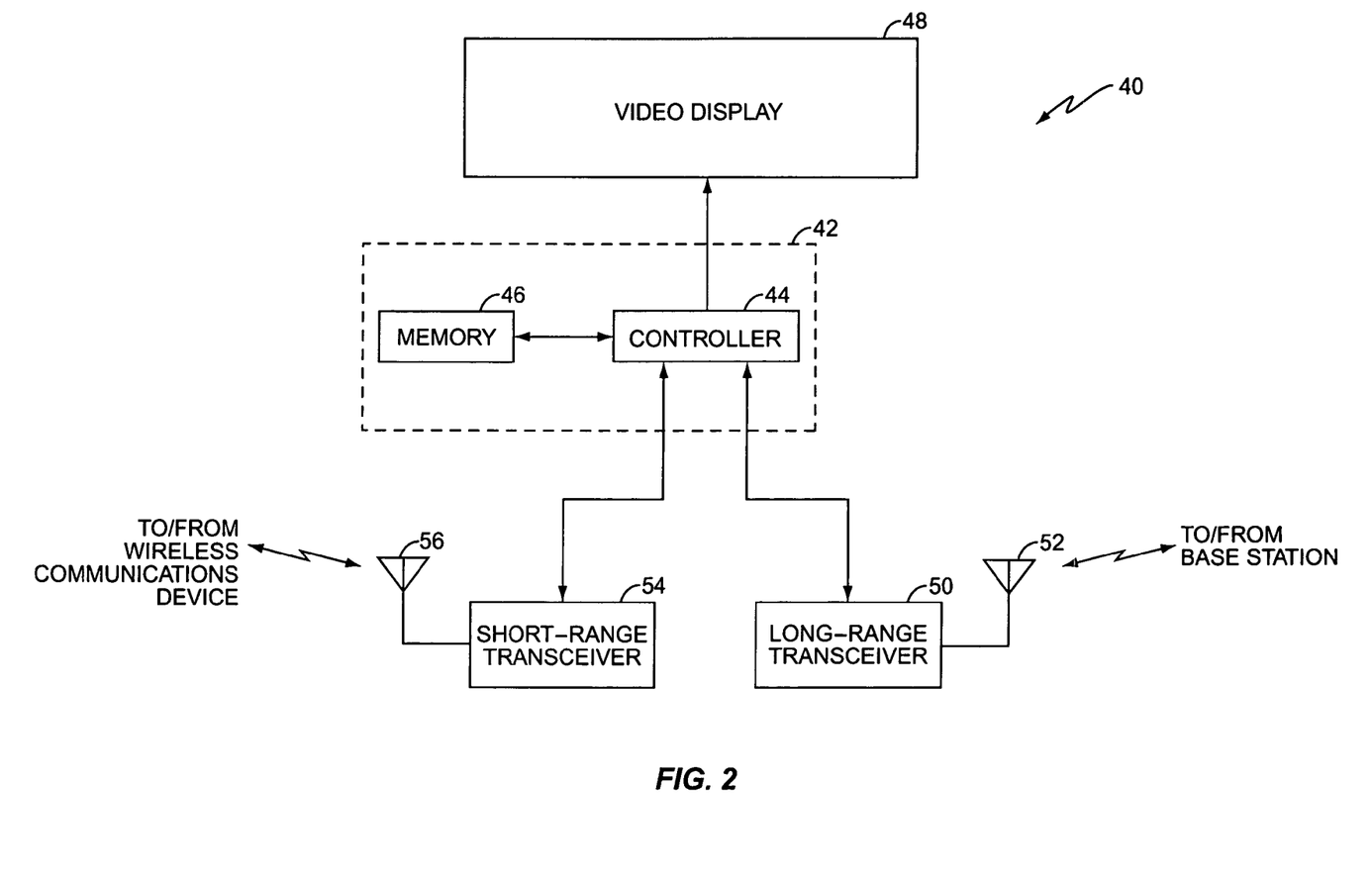
FIG. 2 illustrates an audio-video network configured to operate according to one embodiment of the present invention.

According to the present invention, short-range transceiver 30 and/or long-range transceiver 26 permit wireless communication device 10 to communicate signals with corresponding transceivers in a remote audio-video system, such as audio-video system 40 illustrated in FIG. 2. Audio-video system 40 comprises a server 42, a display 48, a short-range transceiver 54, and a long-range transceiver 50. Audio-video system 40 may be, for example, disposed on an aircraft for playing in-flight movies, or within an airport for displaying television programs on one or more televisions distributed throughout the terminal. In one embodiment, audio-video system 40 is located in a publicly accessible area, such as a town square, for example. Audio-video system 40 outputs video to a display screen connected to audio-video system 40, and delivers audio signals to one or more nearby wireless communication devices 10.

Server 42 may be any server known in the art, for example, a computing device, and includes controller 44 and memory 46. As described in more detail below, server 42 is responsible for outputting a video signal to the display 48 and outputting an associated audio signal to one or more wireless communication devices 10 via long-range transceiver 50 and/or short-range transceiver 54. While not explicitly shown in the figures, server 42 may be connected to both public IP networks (e.g., the Internet), and private IP networks to permit the operators of audio-video system 40 to perform system and administrative functions.

Controller 44, like controller 20, controls the operation of audio-video system 40 according to programs and data stored in memory 46, and may be implemented as a single microprocessor or multiple microprocessors. In accordance with the present invention, controller 44 outputs the video signal for display on display 48, and the audio signal associated with the video signal to one or more user wireless communication devices 10. If desired, controller 44 may be configured to use known standards to encrypt the audio signal prior to transmission to wireless communication device 10, and further, may be configured to authenticate wireless communication device 10 according to known authentication techniques. Additionally, controller 44 may be configured to use preference information associated with a particular user in determining how to deliver the audio to the user.

Memory 46 is much like memory 22 of wireless communication device 10. However, in some embodiments, memory 46 stores the user preference information. As previously stated, controller 44 would read and use these files as needed or desired, and establish a communications link between audio-video system 40 and wireless communication device 10 responsive to a request, or alternatively, to detection of wireless communication device 10.

Video display 48 may be any display known in the art including, but not limited to, a television, a Liquid Crystal Display (LCD), plasma screen, or a projection screen. Video display 48 provides a medium on which video signals output by controller 44 are displayed, and may be any size desired to ensure that one or more people could view the output video signals. In one embodiment, video display 48 is fixedly attached to a substantially permanent structure in a publicly accessible area, such as the side of a building in a large city.

Short-range transceiver 54 includes an antenna 56 to communicate with short-range transceiver 30 of wireless communication device 10 via a short-range interface. Like transceiver 30 of wireless communication device 10, short-range transceiver 54 may also be a BLUETOOTH transceiver, or any transceiver known in the art operable to transmit and receive signals over short distances. Short-range transceiver 54 communicates signals between wireless communication device 10 and controller 44 whenever a communications link is established between transceivers 30 and 54.

Figure 3:
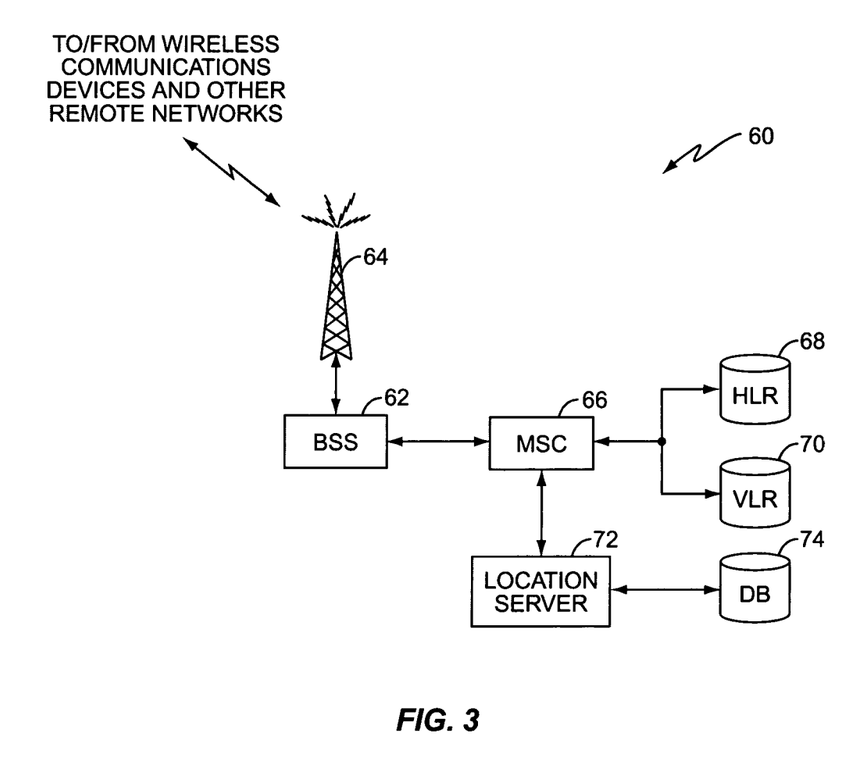
FIG. 3 illustrates one embodiment of a wireless communication network used in establishing a communications link according to one embodiment of the present invention.

Long-range transceiver 50 is coupled to antenna 52 for receiving signals from and transmitting signals to one or more base station subsystems in a wireless communication network (FIG. 3). Like long-range transceiver 26 of wireless communication device 10, long-range transceiver 50 is also a fully functional cellular radio transceiver operating according to any known standard. To facilitate communications with the wireless communication network, long-range transceiver 50 might be assigned a unique identifier by the network, and thus, communicate with wireless communication device 10 via the wireless communication network. While FIG. 2 illustrates long-range transceiver 50 and short-range transceiver 54 as being separate from server 42, it should be noted that one or both transceivers 50 and/or 54 might in fact be part of server 42.

FIG. 3 illustrates a typical configuration of a wireless communication network 60 suitable for use with long-range transceiver 26 and/or 50 according to one embodiment of the present invention. Network 60 operates according to any known standard, and comprises one or more Base Station Subsystems (BSS) 62 connected to a Mobile Switching Center (MSC) 66. Each BSS 62 may include one or more antennas 64, and provides cellular services to wireless communication device 10 and long-range transceiver 50 over a specified geographic region known as a cell. BSS 62 facilitates communications between the user of wireless communication device 10 and audio-video system 40, and transmits control signals and data to wireless communication device 10 and long-range transceiver 50. As described later in more detail, these signals may include, for example, messages regarding audio, video, preferences, and location.

MSC 66 routes calls to and from wireless communication device 10 and transceiver 50 through BSS 62, and communicates with Home Location Register (HLR) 68, Visitor Location Register (VLR) 70, and Location Server (LS) 72. HLR 68 and VLR 70 store information concerning the location and activity status of wireless communication device 10 and long-range transceiver 50. As is known in the art, HLR 68 and VLR 70 may or may not be co-located with MSC 66, or may be integrated with MSC 66.

LS 72 typically serves a plurality of cells in addition to serving the cell covered by BSS 62, and preferably includes one or more databases (DB) 74 that contains, for example, up-to-date positioning data for determining the geographic location of wireless communication device 10. DB 74 may also store information regarding the location of the long-range transceiver 50 and/or audio-video system 40. This information might include coordinates defining a boundary of a geographical area identified as the zone over which audio-video system 40 may communicate. Typically, the area of the zone would generally coincide with an area in which display 48 is viewable by a user of wireless communication device 10; however, the boundaries may be as large or as small as desired. Network 60 might signal audio-video system 40 with the identity of wireless communication device 10 whenever it detects that wireless communication device 10 is in or proximate audio-video system 40.

As previously stated, the present invention delivers an audio signal that is associated with a video signal being displayed on a common display 48 to wireless communication device 10. The audio signal is typically synchronized to the video being displayed, encrypted if desired, and transmitted to wireless communication device 10 via a short-range interface or the wireless communication network 60. Once wireless communication device 10 receives the audio signal, audio processing circuit 24 renders the audio signal as audible sound over speaker 18 or headset 34. In other words, the present invention separates the video and audio streams, and delivers them to different devices (i.e., common display 48 and wireless communication device 10, respectively).

Figure 4:
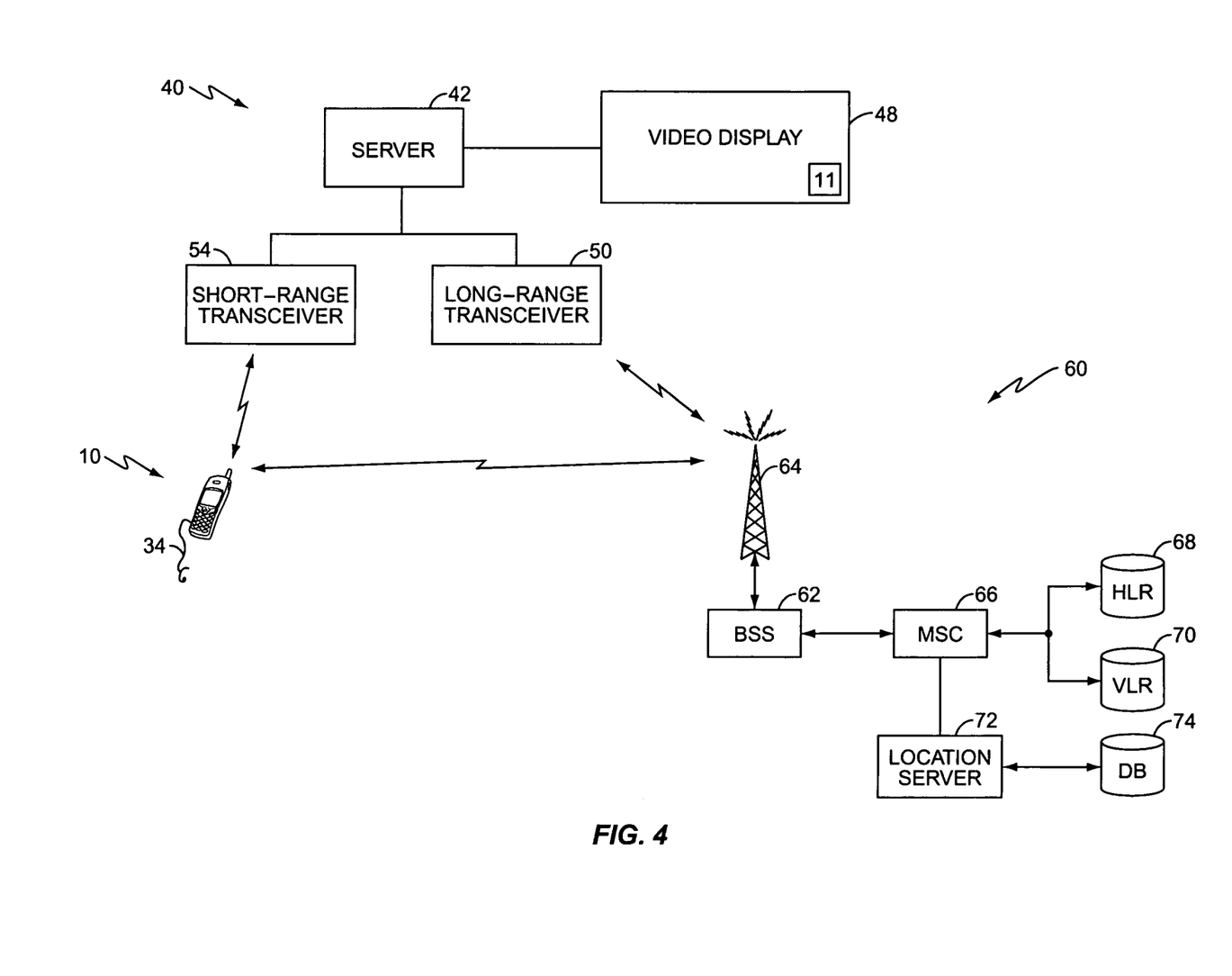
FIG. 4 illustrates the interaction between the wireless communication device, the audio-video network, and the wireless communication network according to one embodiment of the present invention.

FIG. 4 illustrates how wireless communication device 10, audio-video system 40, and network 60 might interact to deliver an audio signal to wireless communication device 10 according to the present invention. In one embodiment, wireless communication device 10 enters into a zone that is proximate audio-video system 40. When this occurs, short-range transceivers 30, 54 may detect one another in accordance with well-known BLUETOOTH or other short-range interface standards, and establish a short-range communications link between short-range transceivers 30, 54. Detection and establishment of the communications link may either be done automatically, or with user interaction using keypad 14. For example, audio-video system 40 may detect the presence of wireless communication device 10, and send a message via short-range transceiver 54 to ask the user if he or she would like to receive the audio signal. Additionally, the message may be transmitted by long-range transceiver 50 via network 60. The request may be in the form of a text message over the user's display 12 or audible alarm, for example, and the user may decline or accept the request using keypad 14. Alternatively, the user may notice the presence of audio-video system 40, and send an explicit request to join the ad-hoc network of audio-video system 40.

Those skilled in the art will appreciate that not all devices 10, nor all systems 40, may be equipped with the components necessary to communicate using a short-range interface. As such, the present invention also contemplates an embodiment wherein the audio signal may be delivered to wireless communication device 10 via network 60. In this embodiment, network 60 may relay the signaling between wireless communication device 10 and audio-video system 40. For example, MSC 66 is aware of both the zone within which audio-video system 40 operates, and the current geographical location of wireless communication device 10. When MSC 66 determines that wireless communication device 10 is within or proximate this zone, it may send a request to wireless communication device 10 asking the user whether he or she wishes to receive an audio signal associated with the video being displayed. The user can then accept or decline the request using keypad 14. Alternatively, audio-video system 40 may periodically request the identities from network 60 of devices 10 that are proximate audio-video system 40 (e.g., within some predetermined threshold distance). Network 60 could then report the information to audio-video system 40, or transmit requests to those devices 10 that are within the threshold distance on behalf of audio-video system 40. If wireless communication device 10 responds positively to the request, audio-video system 40 can deliver the audio signal to wireless communication device 10 via network 60.

Thus, the establishment of a short-range and/or long-range communications link and delivery of audio signals over the link may be accomplished with or without interaction by the user. To facilitate this, the user may pre-configure and store a profile that on wireless communication device 10 or audio-video system 40, or alternatively, along with other user-specific data in network 60. The profile might contain information regarding certain preferences with respect to receiving the audio signal from audio-video system 40. These may include whether the user is amenable to receiving a particular audio signal, a selected language in which the user wants to listen to the audio signal, the identity of wireless communication device 10, billing information, a selected method of encryption, and information to assist in the establishment of the short-range and/or long-range interface. As should be understood, this list of preferences is not exhaustive, and other preferences may or may not be contained in the user's profile. Upon the automatic detection of wireless communication device 10/audio-video system 40 or manual activation, the profile would be read from memory and used to establish the communications channel and/or control how the audio signal is delivered to wireless communication device 10.

In one embodiment, for example, the information in the profile indicates whether controller 44 should transmit the audio to wireless communication device 10 in the English language or some other language. In other embodiments, the user preference information instructs controller 44 whether to even establish a link based on the content of the video being displayed. Thus, if audio-video system 40 were displaying video relating to sports, a communications channel would be established only if the user's profile contained information that indicated that the user is interested in sports. If the user's preference information indicated otherwise, no communications link would be established. However, those skilled in the art will appreciate that a user profile, while useful, is not necessary for operation of the present invention as the user may manually enter this information via keypad 14.

Figure 5:
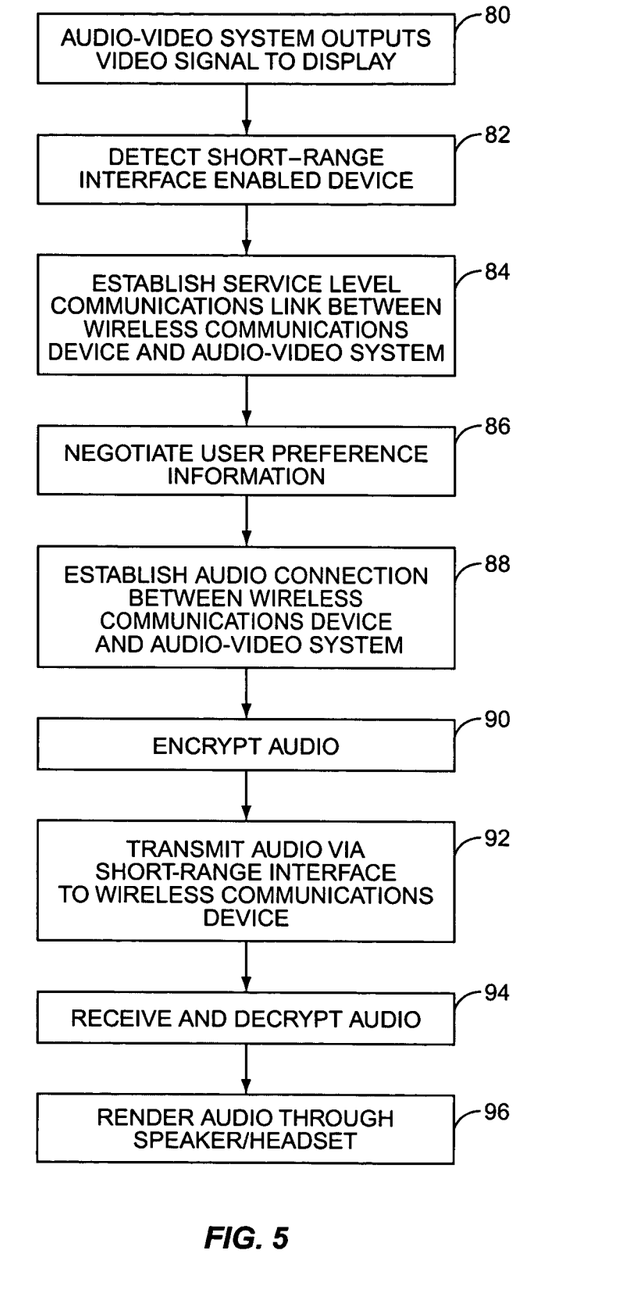
FIG. 5 is a flow diagram that illustrates a method according to one embodiment of the present invention.

FIG. 5 illustrates one embodiment of the present invention wherein both wireless communication device 10 and audio-video system 40 are equipped to communicate via a short-range interface. In this embodiment, audio-video system 40 is displaying a video signal on display 48 (box 80). As is known in the art, BLUETOOTH-enabled devices are typically in a stand-by mode from which they periodically listen for a signal from other BLUETOOTH-enabled devices. In this embodiment, wireless communication device 10 receives a paging message from audio-video system 40 when wireless communication device 10 enters an area that is within close proximity to audio-video system 40 (box 82). Once detection occurs, a service level communications link is established between transceivers 30 and 54 (box 84). During the establishment of the service level communications link, the short-range transceivers 30, 54 exchange information that enables them to synchronize to one another. This information may include, for example, protocol negotiation, device identities, capabilities, authentication information, and clock synchronization data. Next, wireless communication device 10 may retrieve the user preference information from memory 22, and transmit it to audio-video system 40 (box 86). As previously stated, the preference information may include, inter alia, a language in which the user wishes to hear the audio. Alternatively, the user may enter the preference information using keypad 14 responsive to one or more request messages sent by audio-video system 40, and transmit the preference information to audio-video system 40.

Once the service level link is established and controller 44 is aware of the user's preferences, short-range transceivers 30, 54 establish an audio channel (box 88). If desired, controller 44 may first encrypt the audio (box 90). Controller 44 then transmits the audio signal associated with the video being displayed to wireless communication device 10 in the user's selected language (box 92). Upon reception, controller 20 will decrypt the received audio signal (box 94), and audio processing circuit 24 will render the audio signal as audible sound through speaker 18 or headset 34. It should be understood that upon failure of any of these steps, audio-video system 40 and/or wireless communication device 10 could terminate the communications link.

Figure 6:
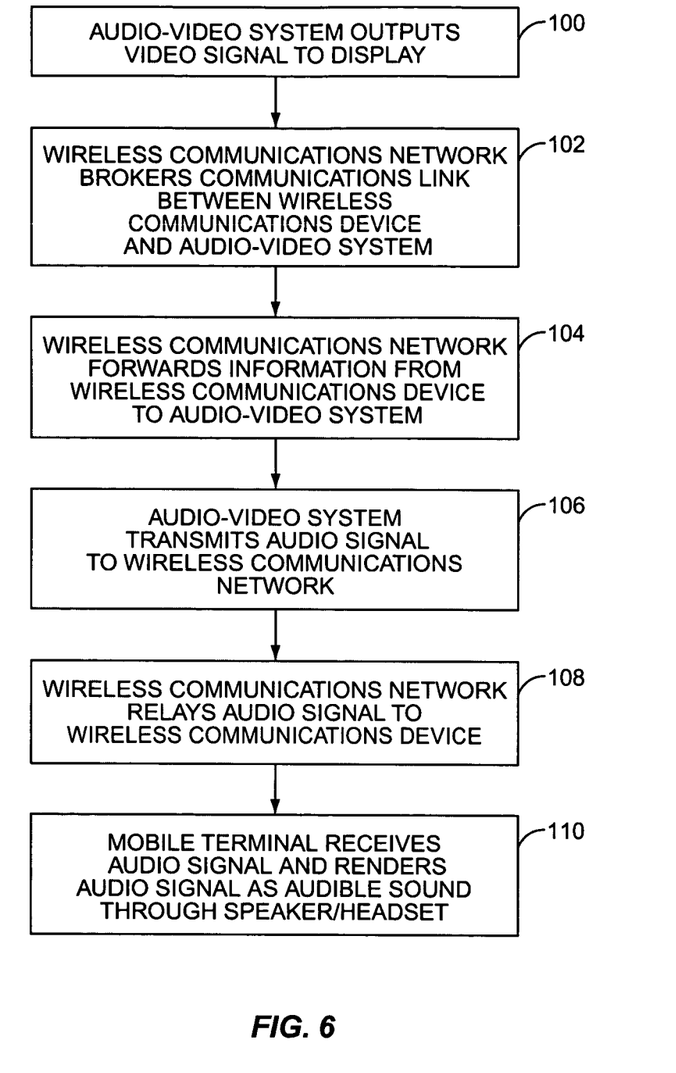
FIG. 6 is another flow diagram that illustrates an alternate method according to one embodiment of the present invention.

FIG. 6 illustrates an alternate embodiment wherein wireless communication device 10 and/or audio-video system 40 may not be equipped for a short-range interface. Thus, audio-video system 40 delivers the audio signal to wireless communication device 10 via network 60. In this embodiment, audio-video system 40 is displaying a video signal on display 48 (box 100). Network 60 is aware of geographic positions of both audio-video system 40 and wireless communication device 10, and brokers a communications link between wireless communication device 10 and audio-video system 40 (box 102). For example, it is known that wireless communication device 10 periodically transmits or receives information regarding its position to network 60. This information may be stored in HLR 68, VLR 70, or Location DB 74. Network 60 might compare this position information to coordinates that define a boundary around audio-video system 40. In essence, this boundary may be thought of as a piconet cell, or an area within which a user could view the video being displayed on display 48. Network 60 could then send a message to wireless communication device 10 offering the user of wireless communication device 10 the opportunity to receive an audio signal from audio-video system 40. If the user answers affirmatively, network 60 forwards the user's preference information to audio-video system 40 (box 104). As in the previous embodiment, the user's preference information may include a selected language.

Upon receipt of the user's information, audio-video system 40 encrypts the audio signal associated with the video signal currently being displayed, and transmits the audio signal via long-range transceiver 50 to BSS 62 (box 106). BSS 62 then relays the audio signal to wireless communication device 10 (box 108), which renders the audio as audible sound to the user (box 110). Like the previous embodiment, termination of one or both of the communications links may be effected upon failure of any of the steps, or upon an explicit request by wireless communication device 10, audio-video system 40, or network 60.

Therefore, the present invention may be used to deliver an audio signal to individual user wireless communication devices 10 even when the devices 10 are not typically part of a network that displays the video signal. This is useful in many situations, such as when a video is being displayed in an area with an unacceptable level of ambient noise. In addition, however, the present invention might also be used in situations where a plurality of different video segments is being displayed. For example, sports bars typically display sports related programming on a plurality of televisions placed around the room. Considering the variety of patrons, each television usually has a different program associated with it.

Figure 7:
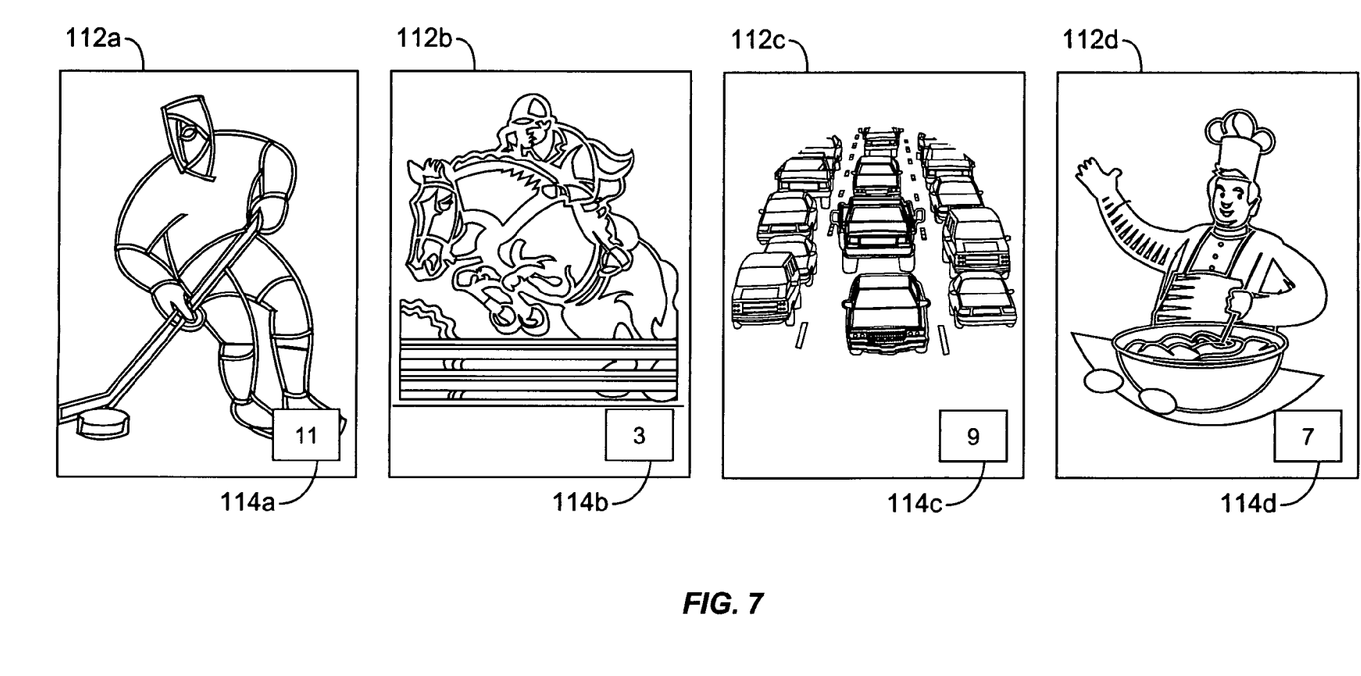
FIG. 7 illustrates an alternate embodiment of the present invention.

As seen in FIG. 7, display 48 is separated into a plurality of segments 112a-112d. These segments 112 may be portions of a single display 48, or may be a plurality of displays 48, such as a bank of televisions. In this embodiment, controller 44 is configured to display a different video signal on each segment 112a-112d. In addition, controller 44 is also configured to superimpose or display an indicator 114a-114d that identifies the particular video being displayed. The user, as part of the service level communications link establishment, for example, could identify which particular video he is interested in by entering the indicator 114 via keypad 14. In this case, the user enters indicator 114a—the number eleven (11)—to indicate interest in segment 112a. Upon receipt by audio-video system 40, controller 44 would then deliver only the audio signal associated with the indicator 114a entered by the user. The user could then enter other indicators as desired to cause transceiver 50 or 54 to transmit a different audio signal associated with the selected video signal.

The present invention may, of course, be carried out in ways other than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless communication device for use in an audio video network comprising:
   a controller to establish a long-range cellular communications link with an audio-video system via a base station subsystem in a wireless communication network when the wireless communication device is positioned proximate a display in the audio-video system;
   a transceiver to communicate with one or more remote parties via the wireless communication network, and to receive an audio signal from the audio-video system over the established cellular communications link, the audio signal being synchronized with a video signal being output to the display by the audio-video system; and an audio processing circuit to render the received audio signal as audible sound to a user of the wireless communication device.

2. The device of claim 1 further comprising a short-range transceiver that communicates with a corresponding short-range transceiver in the audio-video system.

3. The device of claim 1 further comprising memory to store user preference information pre-configured by the user, and wherein the controller is configured to receive the audio signal based on the user preference information.

4. The device of claim 3 wherein the transceiver transmits the user preference information to the audio-video system via the wireless communication network.

5. The device of claim 3 wherein the user preference information includes information specifying a selected language.

6. The device of claim 3 further comprising a keypad and a display to permit the user to manually select the user preference information.

7. The device of claim 1 wherein the controller is configured to authenticate the wireless communication device with the audio-video system.

8. The device of claim 1 wherein the controller is configured to decrypt an encrypted audio signal received from the audio-video system.

9. The device of claim 1 wherein the wireless communication device comprises a cellular telephone.

10. A method of rendering an audio signal on a wireless communication device comprising:
  establishing a long-range cellular communications link between the wireless communication device and an audio-video system via a base station subsystem in a wireless communications network when the wireless communication device is located proximate a display in the audio-video system;
  receiving an audio signal from the audio-video system over the cellular communications link, the audio signal being synchronized with a video signal being output to the display by the audio-video system; and
  rendering the received audio signal as audible sound on the wireless communication device.

11. The method of claim 10 further comprising establishing an ad-hoc short-range communications link between a short-range transceiver in the wireless communication device and a corresponding short-range transceiver in the audio-video system.

12. The method of claim 10 wherein establishing a cellular communications link comprises authenticating the wireless communication device.

13. The method of claim 10 wherein establishing a cellular communications link comprises negotiating user preference information to receive the real-time audio signal based on the user preference information.

14. The method of claim 13 further comprising transmitting the user preference information to the audio-video system.

15. The method of claim 13 wherein the user preference information is stored in memory of the wireless communication device.

16. The method of claim 13 wherein the user preference information comprises a selected language.

17. The method of claim 10 further comprising selecting the audio signal to be transmitted by the audio-video system.

18. The method of claim 17 wherein selecting the audio signal to be transmitted comprises transmitting an indicator to the audio-video system, the indicator being displayed by the audio-video system on the display and associated with the video signal.

19. The method of claim 10 further comprising decrypting the audio signal at the wireless communication device.

20. An audio video system comprising:
  a display to display a video signal;
  a controller configured to:
    establish a long-range cellular communications link between the audio-video system and a wireless communication device via a base station subsystem in a wireless communications network when the wireless communication device is proximate the display; and
    output the video signal to the display; and
  a transceiver to transmit an audio signal synchronized with the video signal being output to the display by the audio-video system to the wireless communication device over the established cellular communication link.

21. The system of claim 20 further comprising a short-range transceiver configured to establish a short-range communications link between the wireless communication device and a corresponding short-range transceiver in the wireless communication device.

22. The system of claim 20 wherein the controller is further configured to negotiate user preference information to receive the audio signal based on the user preference information.

23. The system of claim 22 further comprising memory coupled to the controller to store the user preference information, and wherein the controller reads the user preference information when the cellular communications link is established.

24. The system of claim 22 wherein the transceiver receives the user preference information from the wireless communication device over the cellular communications link.

25. The system of claim 22 wherein the user preference information specifies the selected language.

26. The system of claim 20 wherein the controller is further configured to authenticate the wireless communication device.

27. The system of claim 20 wherein the controller is further configured to encrypt the audio signal prior to transmitting the audio signal to the wireless communication device.

28. The system of claim 20 further comprising a plurality of displays to display a plurality of video signals, and wherein the controller is configured to output the plurality of video signals to the plurality of displays.

29. The system of claim 28 wherein the controller is further configured to assign each video signal in the plurality of video signals an indicator that associates each video signal with a corresponding audio signal.

30. The system of claim 29 wherein the controller is configured to control the transceiver to transmit the audio signal associated with a selected indicator to the wireless communication device.

31. A method of rendering an audio signal on a wireless communication device comprising:
  outputting a video signal to a display of an audio-video system;
  establishing a long-range cellular communications link between a wireless communication device and the audio-video system via a base station subsystem in a wireless communication network when the wireless communication device is proximate the display; and
  transmitting the audio signal to the wireless communication device over the established cellular communications link, the audio signal being synchronized with the video signal being output to the display.

32. The method of claim 31 further comprising establishing a short-range between a short-range transceiver in the wireless communication device and a corresponding short-range transceiver in the audio-video system.

33. The method of claim 31 further comprising authenticating the wireless communication device at the audio-video system.

34. The method of claim 31 wherein establishing the cellular communications link comprises negotiating user preference information to receive the audio signal based on the user preference information.

35. The method of claim 34 wherein negotiating the user preference information comprises receiving the user preference information from the wireless communication device.

36. The method of claim 34 wherein negotiating the user preference information comprises reading the user preference information from memory at the audio-video system.

37. The method of claim 34 wherein the information specific to the user's preferences includes a selected language.

38. The method of claim 31 further comprising encrypting the audio signal prior to transmitting the audio signal to the wireless communication device.

39. The method of claim 31 further comprising outputting a plurality of video signals to a plurality of displays disposed in the audio-video system.

40. The method of claim 39 further comprising assigning each video signal in the plurality of video signals an indicator, wherein each indicator associates the video signal with a corresponding audio signal.

41. The method of claim 40 further comprising displaying the indicators along with the assigned video signals on the displays.

42. The method of claim 41 further comprising receiving a selected indicator from the wireless communication device, and transmitting the audio signal associated with the selected indicator to the wireless communication device.

* * * * *